Aug. 25, 1964     A. A. LACHANCE ETAL     3,145,856
GROCERY CART WITH MEANS FOR UNLOADING SAME
Original Filed May 26, 1960     2 Sheets-Sheet 1
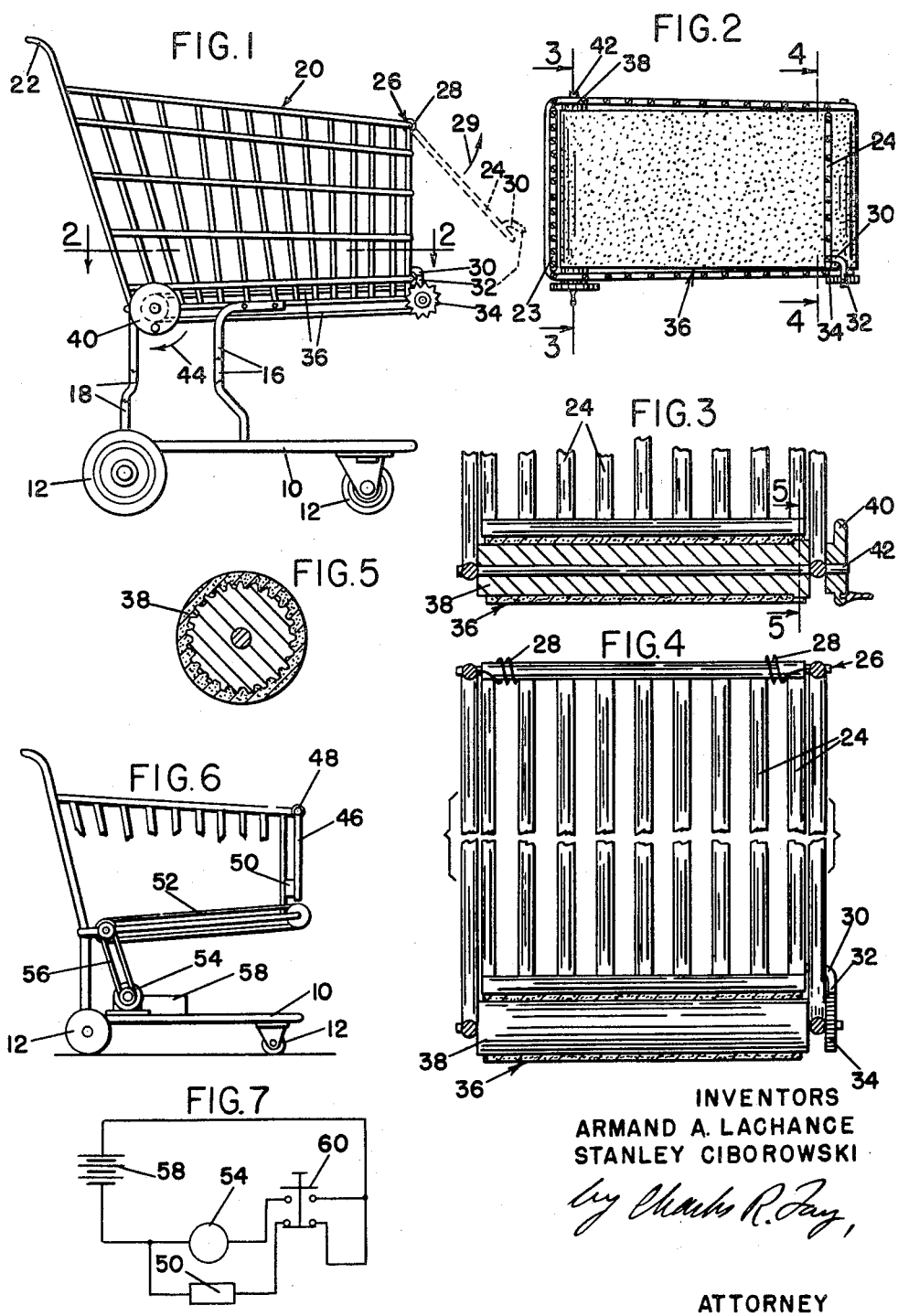
INVENTORS
ARMAND A. LACHANCE
STANLEY CIBOROWSKI
ATTORNEY Aug. 25, 1964 A. A. LACHANCE ETAL 3,145,856
GROCERY CART WITH MEANS FOR UNLOADING SAME
Original Filed May 26, 1960 2 Sheets-Sheet 2
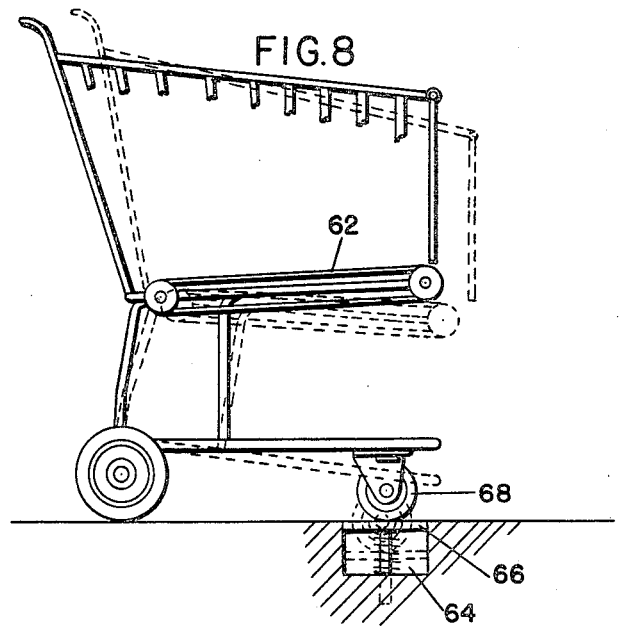
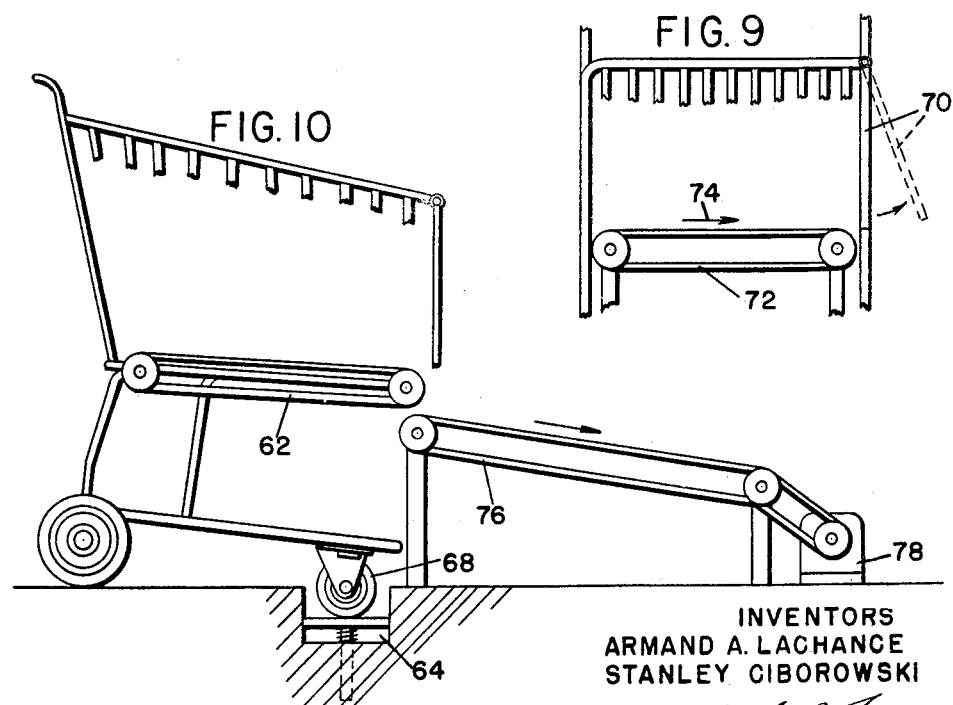
INVENTORS
ARMAND A. LACHANCE
STANLEY CIBOROWSKI
ATTORNEY

United States Patent Office 3,145,856
Patented Aug. 25, 1964

3,145,856
GROCERY CART WITH MEANS FOR UNLOADING SAME
Armand A. Lachance, North Oxford, Mass. (% American Metal Products Co., Southbridge St., Auburn, Mass.), and Stanley Ciborowski, Worcester, Mass.; said Ciborowski assignor to said Lachance
Original application May 26, 1960, Ser. No. 31,918. Divided and this application June 19, 1961, Ser. No. 124,267
2 Claims. (Cl. 214—46)

This invention relates to a new and improved combination of a grocery cart including means for unloading it, with a checkout station including a counter which is set on the floor, and there being a recess in the floor at a predetermined point relative to the counter so that when certain wheels of the cart enter the recess the cart is tilted down, there being a conveyor in the cart forming an article-supporting bottom so that the articles can be discharged by the conveyor on a downward tilt, and the counter includes means which is on a level to receive the articles from the conveyor when the cart is so tilted.

The invention further relates to arrangements and combinations of parts which will be hereinafter described and more particularly set forth in the appended claims.

Reference is to be had to the accompanying drawings, in which

FIG. 1 is a view in side elevation illustrating a form of the invention;

FIG. 2 is a section on line 2—2 of FIG. 1;

FIGS. 3 and 4 are sections on an enlarged scale on the respective lines in FIG. 2;

FIG. 5 is a section on line 5—5 of FIG. 3 on an enlarged scale;

FIG. 6 is a diagrammatic view illustrating a modification;

FIG. 7 is a circuit illustrating the operation of the motor of FIG. 6;

FIG. 8 is a diagrammatic view in side elevation illustrating a form of the invention;

FIG. 9 is a diagrammatic view in front elevation showing a modification; and

FIG. 10 is a diagrammatic view showing the cart of FIG. 8 in cooperation with a fixed carry-off conveyor.

In carrying out the present invention, a platform 10 is provided and this platform is provided with wheels 12, 12. On the platform are provided upstanding members 16 and 18 for holding a basket generally indicated at 20 thereon. This basket has a pusher handle 22 and a swinging rear gate 23 as is customary with market baskets of the type described.

Also, however, this new basket has a swinging gate which is illustrated at 24. This swinging gate may be located in any part of the front or sides of the basket but as shown it is at the front. Gate 24 is pivoted preferably at the top of the basket as on an axis which is indicated by the reference numeral 26, and it is also provided with spring means or the like 28 normally urging it to rise in the direction of the dotted arrow 29 in FIG. 1. The springs 28 may be of any kind and any other means may be used in order to allow or provide for the upward swinging motion of the gate.

A latch is provided as indicated at 30 and this latch has a free-ended point or the like 32 which engages with teeth on a friction or otherwise retarded wheel 34 to hold the gate in its downwardly closed position so as to provide an adequate container for the goods purchased by the customer.

The entire bottom of the grocery cart is comprised of a belt-like conveyor which is indicated by the reference numeral 36. This is trained over fore-and-aft pulleys which are indicated at 38. These pulleys can be hand operated by a crank 40 or by a motor as will be hereinafter described and as shown in FIG. 6, or any other means can be used to cause the conveyor to move in a direction to discharge the goods through the open gate 24.

Also, if desired, the toothed wheel 38 may be held in position by a spring detent or the like, or any common means may be used for this purpose, and it may also be secured to the shaft 42 which is operated by the hand wheel 40 so that when the latter is turned in the direction of the arrow 44 in FIG. 1, the lock 32 will be released, the gate will fly up, and the goods will issue from the basket to the counter.

Turning now to FIG. 6, the same kind of wheeled cart, etc. is illustrated as above described but in this case there is a swinging gate 46 having the same spring 48 as shown at 28, or other means for moving said gate upwardly in a counterclockwise direction. In this case, an electromagnet or the like at 50 can be utilized to hold the gate in normal downward position. Also the conveyor 52 is powered by an electric motor 54 through the intermediary of a belt or gears 56, and this can be run either from a plug-in type of device or a battery 58. FIG. 7 shows how the battery can be utilized to energize the motor 54 and the electromagnet 50 at the same time by means of a double pole switch 60.

This invention may be carried out by other and similar means without departing from the scope of the invention. The conveyor 36 or 52 may be power driven by any other means such as is illustrated in copending patent application Serial No. 31,917 filed May 26, 1960, or the grocery cart may be brought up to a central or predetermined location where a clutch or the like may be plugged into either of the shafts for the rolls 38 in order to rotate the same and travel the belt. Many other ways of traveling the belt may be used again without departing from the scope of the invention.

As an example, referring to FIG. 8, the basket shown which has a conveyor thereon similar to that at 36 but herein indicated as at 62 is shown at tilting upwardly as in FIG. 6 in order to carry out the nesting function and it may be desired that this belt 62 should incline downwardly in order to make sure that all the goods are ejected from the cart. For this purpose there is provided in the floor at the appropriate location at the checking-out counter a depression or recess 64 which may have in it a yielding support 66 of any desired kind or description so that when the front wheel 68 coincides therewith, the cart becomes depressed at the forward position thereof whereby the same takes the dotted line position and the conveyor is now slanting downwardly so that when the part of the side wall opens up as above described, all the goods will be ejected.

FIG. 9 merely illustrates how a part of a side surface of the cart may be opened as at 70 and the conveyor 72 may extend crosswise of the cart, traveling in the direction indicated by the arrow 74 in FIG. 9 rather than out the front or the back. Obviously of course the opening at 70 may be applied at the opposite side of the cart also if desired.

In FIG. 10 there is shown a cart which is similar to that at FIG. 8, the conveyor 62 being shown tilted down forwardly and in this case there is also shown a cooperating fixed conveyor 76 which may be driven by a motor 78 or the like and which is arranged in relation to the depression 64 in such a way as to continue the downward motion of the goods from conveyor 62, the forward end of which overlaps the adjacent end of the conveyor 76, thus preventing any lodgment of articles between the adjacent rollers or pulleys for the conveyors which might possibly disrupt the free flow of the goods from the cart to the predetermined checking-out station.

This invention provides a means for automatically depositing the goods in the basket to a central accounting location or charge-out desk, and this results in a great deal of speed-up of the work done at the charge-out desk for servicing more customers per period of time than is possible at the present time with the usual cart wherein the customer has to remove separately each of the articles out of the basket and place them on the charge-out counter.

This application is a division of application Serial No. 31,918 filed May 26, 1960.

Having thus described our invention and the advantages thereof, we do not wish to be limited to the details herein disclosed, otherwise than as set forth in the claims, but what we claim is:

1. The combination of a checkout station including a counter set on a floor, with an automatically depositing and nesting grocery cart, wherein there is a recess in the floor at a predetermined point relative to the end counter and the cart includes wheels at one end that are adapted to partially enter the recess and tilt the cart down at said one end by gravity, a basket on the cart, a conveyor in the cart forming an article supporting bottom for the basket, a portion of the wall of the basket being outwardly swingable and the conveyor discharging articles thereon toward and through the opening formed thereby, the swinging wall portion of the basket being located adjacent the wheels at said one end of the cart, the counter including means on a level to receive the articles from the conveyor when the cart is tilted.

2. The combination of claim 1 wherein the means is a second conveyor.

References Cited in the file of this patent

UNITED STATES PATENTS

| | | |
|---|---|---|
| 2,479,665 | Bainbridge et al. | Aug. 23, 1949 |
| 2,605,912 | Small et al. | Aug. 5, 1952 |
| 2,884,094 | Roy | Apr. 28, 1959 |
| 2,943,707 | Ramlose | July 5, 1960 |
| 3,036,722 | Sharaway | May 29, 1962 |

FOREIGN PATENTS

| | | |
|---|---|---|
| 55,439 | Denmark | Nov. 7, 1938 |